(12) United States Patent
Huang et al.

(10) Patent No.: US 6,173,249 B1
(45) Date of Patent: Jan. 9, 2001

(54) METHOD OF DETERMINING TERMINATION OF A PROCESS UNDER A SIMULATED OPERATING SYSTEM

(75) Inventors: Cheng-Yu Huang, Fremont; Siddhesh Jere, Santa Clara; Jeffrey D. Merrick, Mountain View; Sudesh Saoji, Santa Clara, all of CA (US)

(73) Assignee: Tandem Computers Incorporated, Cupertino, CA (US)

( * ) Notice: Under 35 U.S.C. 154(b), the term of this patent shall be extended for 0 days.

(21) Appl. No.: 09/122,689

(22) Filed: Jul. 24, 1998

(51) Int. Cl.[7] ........................................... G06F 9/00
(52) U.S. Cl. ...................... 703/27; 703/22; 703/20; 709/302
(58) Field of Search ..................... 703/22, 26, 19, 703/27, 20; 395/706, 707; 709/302; 712/231

(56) References Cited

U.S. PATENT DOCUMENTS

| | | | |
|---|---|---|---|
| 4,819,234 | * 4/1989 | Huber | 371/19 |
| 5,613,098 | * 3/1997 | Landau et al. | 395/500 |
| 5,680,584 | * 10/1997 | Herdeg et al. | 395/500 |
| 5,724,590 | * 3/1998 | Goettelmann et al. | 395/707 |
| 5,790,829 | * 8/1998 | Flynn | 395/500 |
| 5,819,063 | * 10/1998 | Dahl et al. | 395/500 |
| 5,963,731 | * 10/1999 | Sagawa et al. | 395/500.27 |

* cited by examiner

Primary Examiner—Kevin J. Teska
Assistant Examiner—Thai Phan
(74) Attorney, Agent, or Firm—Townsend and Townsend and Crew LLP

(57) ABSTRACT

An operating system is simulated to run in conjunction with a native operating system, allowing processes originally developed for the operating system being simulated to be ported to the environment of the native operating system with a minimum of effort. In the event a ported process attempts to communicate with a terminated process before the simulated operating system is notified of the termination, the attempt at communication will return an error. In response, a series of checks are performed to determine if the error was the result of termination of the process with which communication was attempted, or a more serious error that should be reported to the native operating system for action to protect the integrity of data.

6 Claims, 2 Drawing Sheets

METHOD OF DETERMINING TERMINATION OF A PROCESS UNDER A SIMULATED OPERATING SYSTEM

BACKGROUND OF THE INVENTION

The present invention relates generally to computing systems and in particular to a method of determining whether a process has terminated in a environment in which a one operating system is being simulated and runs on top of a second operating system, and the possibly terminated process runs in conjunction principally with the simulated operating system.

Application programs or processes are normally written to run on specific systems, i.e., in conjunction with a specific operating system that performs supervisory control of system resource allocation (e.g., allocation and usage of such system resources as memory, processing time, disk space, peripheral devices, and the like). Use of these processes over time verifies their credibility and operability. The more useful processes become the objects of "porting," transference to other operating systems different from that for which they were originally designed. This will typically require that the process be rewritten for the new operating system, and if the new operating system is substantially different, or the program language in which the process was originally developed is particularly difficult for the new operating system, the porting process can become a tedious task. The porting procedure can, therefore, be time consuming and expensive, depending upon the process, the structure of the old and new operating systems, and other reasons not necessarily relevant here. For this reason, it may be desirable to simulate the old operating system in the new operating system environment so that the process being ported does not need to be substantially revised—if at all.

However, simulating an operating system in order to allow porting of a process or processors may carry with it additional problems. One such problem arises when the simulated operating system has not yet been informed that a ported process (i.e., one that thinks it is running under the simulated operating system) has terminated, and another ported process requests communication with the terminated ported process, and receives back an error. This problem arises, in part, from the fact that among the normal tasks of an operating system is the responsibility of keeping track of the current state of processes running under it, i.e., whether the process is running, is suspended, is stopped, or has terminated. Generally, when a process requests communication access to a terminated process and receives back an error, that the process relays to the operating system, the operating system can check to see if in fact the error resulted from termination of the target process or a fault. Conventional techniques for such monitoring involves keeping global data structures that contain information that reflect the current state of each process called into existence. The data structures can keep an identification (ID) of each ported process when the process is instantiated. However, this ID is often reused so that checking the data structure to determine if a process is terminated can provide misleading results. Simulating an operating system results in a delay between termination of a ported process and notification of that termination to the simulated operating system. It is during this delay that the problem referred to above arises.

Thus, it can be seen that there is needed a way to provide notification of termination of a ported process in an environment in which the ported process is running (or thinks it is running) under a simulated operating system that, in turn, is running under an actual or native operating system different from that simulated.

SUMMARY OF THE INVENTION

The present invention provide a method of uniquely identifying each process instantiated to run in an environment having a simulated operating system, and associated library, used to route routine calls for operating system services and system resources, including interprocessor communication as is typical. Broadly, according to the invention, when a ported process is instantiated to run on the system under the simulated operating system (that, in turn, runs under a native operating system), a data structure is created for that process. The data structure will include data describing and identifying the process by a process identification number (PID) together with a time stamp that identifies the time of creation of the process. The PID and associated time stamp value are written to any other data structures corresponding to earlier-instantiated processes. Other processes created later (or created earlier but since terminated) may have the same process identification number, but the associated time of creation value will be different to thereby differentiate one process from another.

According to the invention, therefore, when one ported process (the "calling" process) attempts to communicate with or call a second ported process (the "target" process) it will make a call to the interprocess communication service (a library function) of the simulated operating system. The interprocessor communication service is structured to, in turn, use the interprocess communication facility of the native operating system. Should the interprocess communication service ("simulated service") of the simulated operating system receive back an error, indicating an inability to use native system resource for that communication, the simulated service will check to determine the status of the called process. According to that check, the simulated service will first utilize a call to the native operating system, using the PID of the target process. This will produce one of two responses: an indication that the target process no longer exists, or an indication that is does exist by a handle with a PID of the target process. In the former case, the simulated service knows that the associated process has terminated. In the latter case, the simulated service knows that a process exists corresponding to the PID that was used, but not that it necessarily is the desired target process. Accordingly, the simulated service will obtain the time of creation value for the PID received with the handle, and compare that to the time of creation value pertaining to the called process as contained in the data structure of the calling process. If there is not a match, the simulated service knows that the target process has terminated, and the process identification number has been re-used. The simulated service will return this information to the calling process. If the time of creation compare does match, the simulated service knows that the attempted call produced a true system error, and will issue a error message to halt the system or produce some other system response to the error.

A significant feature of the present invention is the ability to uniquely identify each process by the time of creation value. This feature, in turn, leads to the ability to differentiate between processes, while allowing process identification numbers to be re-used (thereby permitting smaller process numbers to be used), while at the same time providing a way to determine whether a process has terminated or not.

There are other features and advantages of the present invention that will become apparent to those skilled in this art upon a reading of the following description of the preferred embodiment of the invention which should be taken in conjunction with the accompanying drawings.

DESCRIPTION OF THE PREFERRED EMBODIMENT

Figure 1:
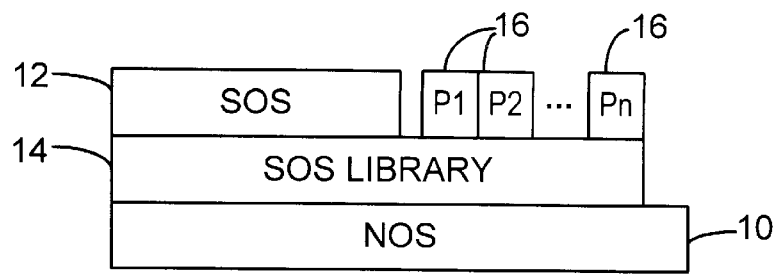
FIG. 1 diagrammatically illustrates the layering used to run a number of ported processes in conjunction with a simulated operating system and associated library, in turn under supervision of a native operating system.

Turning now to the figures, and for the moment specifically to FIG. 1, there is illustrated the layering of the software used for simulating an operating system (the "simulated operating system") to run in conjunction with a different, native operating system. Shown in FIG. 1 then is the native operating system (NOS) 10. The native operating system 10 is preferably one capable of creating and managing a symmetric multiprocessing environment in which multiple processors can execute multiple code threads simultaneously on the multiple processors. Although a symmetric multiprocessing environment is desired, those skilled in this art will see that the present invention can also be implemented in a asymmetric multiprocessing or even multitasking environment. One such operating system capable of supporting a symmetric multiprocessing system is Windows NT. (Windows, NT, and Windows NT are trademarks of Microsoft Corporation of Redmond, Wash.)

Continuing, FIG. 1 shows a number of processes running on (i.e., under the supervision of) the native operating system 10, including the simulated operating system (SOS) 12, a simulated operating system library 14, and a number of "ported" processes (P1, P2, . . . , Pn) 16. The simulated operating system 12 is structured as just another process running on the native operating system 10, and is equal to the other ported processes 16. Not shown in FIG. 1 are processes written specifically for, and running on, the native operating system 10.

The ported processes 16 are processes whose code was originally written for another operating system, one that is here being simulated by the simulated operating system 12. Thus, operating system calls made by the ported processes 16, allocation of resources in response to requests therefor, and other functions of an operating system are handled, in part, by the simulated operating system 12 and its associated library 14, by receiving and handling the request directly, or by enlisting the services and/or resources of the native operating system 10.

Insofar as the processes P1 and P2 are concerned, they are dealing with the simulated operating system 12 or its associated library 14 for certain specific operations. For example, interprocess communication is handled by a library function which, in turn, enlists the interprocess communication service of the native operating system 10.

Figure 2:
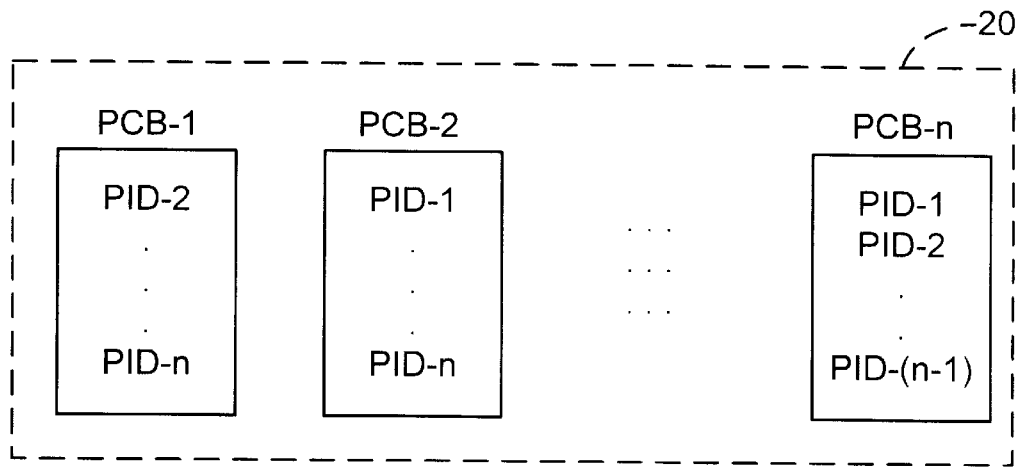
FIG. 2 representatively shows a memory space in which data structures (process control blocks) are created and maintained for the processes shown in FIG. 1.

However, insofar as a ported process 16 is concerned, it is dealing with the simulated operating system 12. If the simulated operating system 12 is not structured to handle the matter, it will act as a conduit between the ported process 16 (e.g., P1, P2) and the native operating system 10. System resources are allocated by the native operating system 10 when the processes P1 and P2 are invoked in the same manner as any other process written to run specifically on the native operating system. There may be special resources, however, used by the processes P1 and P2 when originally written, and these special resources must also be allocated. One such resource is a data structure called a process control block (PCB) that contains information used by the corresponding ported process 16. This is illustrated in FIG. 2 where memory space 20 of the processor(s) (not shown) running the operating systems 10, 12 is allocated for the PCBs (PCB 1, PCB 2) of each process P1, P2, respectively. It will be the responsibility of the simulated operating system 12 to both create the PCBs, and to delete them from the memory space 20 when the corresponding process for which they were created terminates. In addition, when a process terminates, the simulated operating system 12 will be notified so that it can perform its cleanup duties.

Included in the information written to the PCB of a ported process 16, when created is a process identification (PID) value for the other ported processes 16 then viable on the system (regardless of the state, i.e., whether running, asleep, or suspended, etc.). Associated with each PID value is a time of creation value that is maintained by the principal operating system 10. When a ported process 16 is invoked or created, it is given a timestamp, here called the time of creation value. This is a monotonically increasing value, and therefore will be unique for each PID, and thereby each ported process 16. In addition, the PCBs of the then viable ported processes 16 will be written with the PID of the process just created. At the same time, various system resources are allocated the just created process as needed such as, for example, memory space, assigned ports for communication with other processes, and the like—as is conventional.

In a simulated system, such as described here, in which some of the processes are ported from another operating system environment, certain problems can arise. One such problem that can occur is when a ported process 16 attempts an interprocess communication with another ported process 16, prompting an error in response. Was that error because the other process had terminated as a result of finishing its tasks, or the result of a system error? The former case can usually be handled as a non-fatal matter; the latter case is a possible indication of a more serious problem, and may require halting the system in order to investigate the problem further and to keep from propagating possible erroneous data throughout other portions of the system. Such and error can arise when, for example, one of the ported processes (e.g., process P1) attempts to communicate with another ported process (e.g., process P2) and the called process (P2) has terminated. But, the simulated operating system 12 has not yet been notified by the native operating system 10 because the native operating system 10 has not yet finished cleanup activities conventionally performed when a process terminates (e.g., such activities as moving allocated memory space back to the heap, removing data structures used by the terminated process, such as the PCB, etc.).

Figure 3:
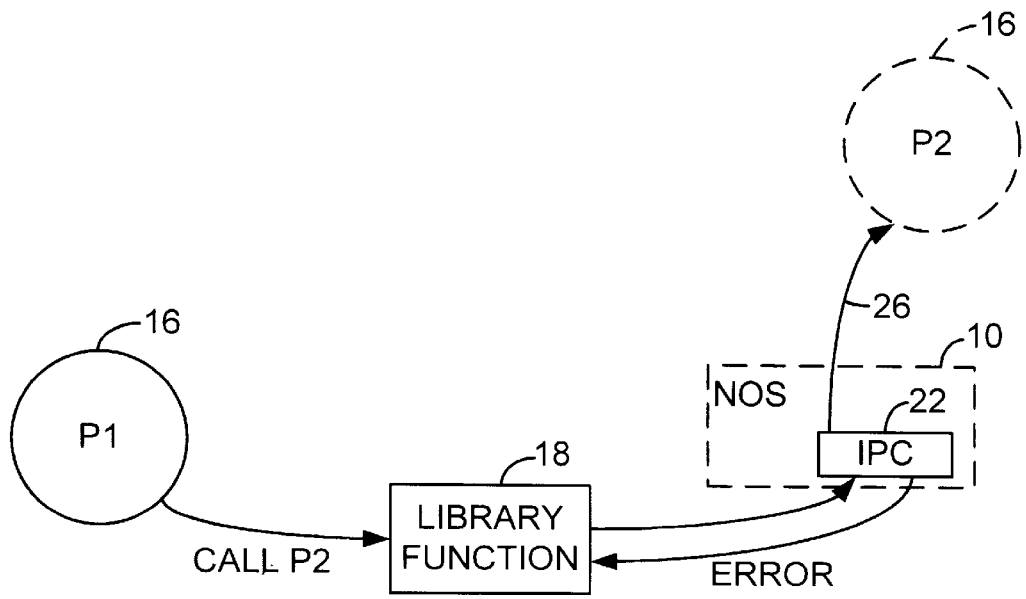
FIG. 3 diagrammatically illustrates an attempt by a calling process to communicate with a terminated called process.

For example, referring to FIG. 3, assume that the ported process P2 has been terminated (as indicated by being shown in phantom in FIG. 3), but that the native operating system 10 has not yet finished its cleanup activities, and therefore has not informed the simulated operating system 12 of the termination of ported process P2. The process P1 initiates a communication with process P2 by a call (CALL P2) to a library function 18 contained in the library 14 (FIG. 1) of the simulated operating system 12. The library function 18, in turn, calls the interprocess communication (IPC) facility 22 of the native operating system 10. If ported process P2 were still installed, that communication would be forwarded by the IPC 22 to the ported process P2 as indicated by the arrow 26. However, since the ported process P2 has terminated, that communication attempt results in an error response (ERROR) that is returned to the library function 18. That error response could be the result of the problem described above: the ported process P2 has terminated and notification of that termination has not yet reached the simulated operating system so that it can notify the process P1 of that fact. Or, the error response could be an indication of something more serious such as a fault that has developed in the system or with the ported process P2. If the error response is the result of a fault, the library function 18 should notify the system (i.e., the native and simulated operating systems 10, 12) so that appropriate action can be taken to protect the integrity of data in the system, and minimize the spread of errors. Thus, the library function 18 needs to check to see if the error response is the result of termination of the process P2.

Figure 4:
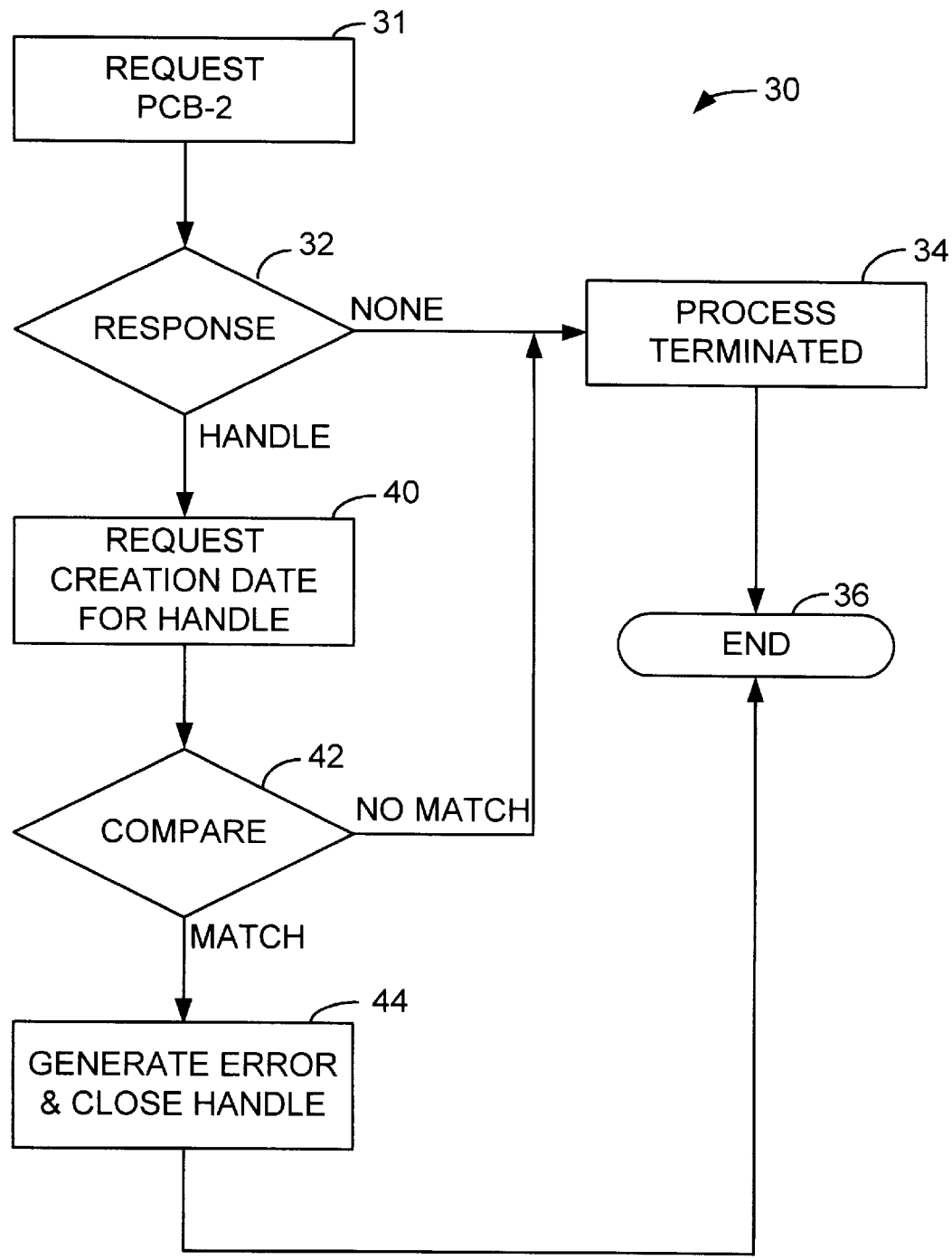
FIG. 4 is a flow diagram that illustrates the steps taken by the calling process of FIG. 3 to check whether the attempt to communicate was thwarted because the target process had terminated.

FIG. 4 broadly illustrates the procedure (designated generally with the reference numeral 30) used by the library function 18, according to the present invention, to determine whether the ported process P2 has terminated. The procedure 30 begins with step 31: the library function 18 will, using the PID for the ported process P2 (obtained from the PCB-1 associated with the process P1), attempt to "open" the process that responds to that PID. (In the NT environment the library will call the OpenProcess function to get a handle to the ported process P2.) If there is no response received for that attempt (step 32), the library function 18 knows that the ported process P2 is not running, i.e., the process P2 has terminated (step 34).

If, on the other hand, a process corresponding to the PID used in the open operation exists (not necessarily the ported process P2), a handle with a same PID as that used in the open operation will be returned. Since, in order to keep PIDs from becoming too large a value, they are reused. It could be that the PID originally assigned to the ported process P2 when it was invoked was re-assigned to another process when the process P2 terminated. Or, it could be that the system has a fault, and that the ported process P2 still exists. To determine for sure which situation exists, the library function 18 will call an NT routine of the native process 10 to obtain, in step 40, the time of creation value for the process identified in the handle. When the library function 18 receives back the requested time of creation value, it will (step 42) compare that with the time of creation value for the ported process P2—saved in the PCB-1 for the ported process P1. If there is no match, the library function 18 now knows that the ported process P2 has terminated, and will return an indication of that termination to the calling process P1. On the other hand, if the time of creation values compared in step 42 are the same, the library function 18 knows that the ported process P2 has not terminated, and that the error most likely was the result of some system error, which could be, or include, the fact the process P2 is in trouble. Thus, at step 44, the library function 18, knowing that the called process P2 has not terminated, and that the failure to communicate is a possible system fault, will issue and error signal to the simulated operating system, close the handle, and end the routine at step 36.

What is claimed is:

1. In a multiprocessing system on which are executing a simulated operating system having an associated library function, a native operating system having an interprocess communication facility, and a plurality of ported processes including a target process, a method of verifying termination of the target process when a communication to the target process is attempted by the calling process, the method including the steps of:

creating a data structure for each of the plurality of processes;

including in each of the data structures a process identification value for the corresponding process;

maintaining for each of the plurality of processes a time of creation value that is indicative of when such process was started on the multiprocessing system;

initiating a communication by one of the plurality of processes with the target process by a call to the library function;

receiving an error by the library function in response to initiating the communication to access a one of the data structures to obtain the process identification value corresponding to the target process;

attempting an open operation on the target process using the corresponding process identification value;

if, in response to the attempting step:
  a) no response is received, the target process is assumed to have terminated operation,
  b) a handle with a target process identification value is received by the library function, obtaining and comparing the time of creation value for the target process identification value time of creation value for the target process to issue an error indication if the compare is equal.

2. The method of claim 1, including the step of executing the simulated operating system as a process under the native operating system.

3. The method of claim 1, wherein the time of creation value for corresponding to each of the processes is maintained in the data stricture for such process.

4. The method of claim 1, wherein the obtaining and comparing step includes the step of obtaining the time of creation value for the target process identification value from the native operating system.

5. In a multiprocessing system on which are executing a simulated operating system having an associated library function, a native operating system having an interprocess communication facility, and a plurality of ported processes including a target process and a calling process, the simulated operating system executing as a process under the native operating system, a method of verifying termination of the target process when a communication to the target process is attempted by the calling process, the method including the steps of:

creating a data structure for each of the plurality of processes;

including in each of the data structures a process identification value and a time of creation value for the corresponding process;

maintaining for each of the plurality of processes a time of creation value that is indicative of when such process was started on the multiprocessing system;

initiating a communication by one of the plurality of processes with the target process by a call to the library function;

receiving an error by the library function in response to initiating the communication to access a one of the data structures to obtain the process identification value corresponding to the target process;

attempting an open operation on the target process using the corresponding process identification value;

if, in response to the attempting step a handle with a target process identification value is received by the library function, obtaining and comparing the time of creation value for the target process identification value time of creation value for the target process to issue an error indication if the compare is equal.

6. The method of claim 5, wherein if the response to the attempting step is no response, the target process is assumed to have terminated operation.

* * * * *

UNITED STATES PATENT AND TRADEMARK OFFICE
CERTIFICATE OF CORRECTION

PATENT NO. : 6,173,249 B1  
DATED : January 9, 2001  
INVENTOR(S) : Huang, et al.

Page 1 of 1

It is certified that error appears in the above-identified patent and that said Letters Patent is hereby corrected as shown below:

<u>Column 6,</u>
Line 41, should read: -- tained in the data structure for such process.--

Signed and Sealed this

Thirtieth Day of October, 2001

*Attest:*

NICHOLAS P. GODICI
*Attesting Officer*     *Acting Director of the United States Patent and Trademark Office*